July 13, 1954 | G. W. FYLER | 2,683,805

TELEVISION RECEIVER

Filed June 11, 1952 | 2 Sheets-Sheet 1

INVENTOR.
George W. Fyler
BY
Foorman L. Mueller
Atty.

July 13, 1954 G. W. FYLER 2,683,805

TELEVISION RECEIVER

Filed June 11, 1952

2 Sheets-Sheet 2

INVENTOR.
George W. Fyler
BY
Norman L. Mueller
Atty.

Patented July 13, 1954 2,683,805

UNITED STATES PATENT OFFICE 2,683,805

TELEVISION RECEIVER

George W. Fyler, Lombard, Ill., assignor to Motorola, Inc., Chicago, Ill., a corporation of Illinois Application June 11, 1952, Serial No. 292,951

7 Claims. (Cl. 250—27)

The present invention relates to television receiver circuits and more particularly to direct current voltage distribution systems for providing the B+ operating potentials for the electron discharge tubes in television receiver circuits.

Television receiver circuits are being continuously improved to increase their efficiency and to simplify the construction and hence to make them more economical to manufacture. A substantial amount of electrical energy is wasted in such circuits in dissipation of heat since many of the electron discharge tubes are operated at comparatively low direct current potentials which are supplied through voltage dropping resistors from a single source of comparatively high direct current voltage. Furthermore, the necessity of providing voltage dropping resistors and the associated decoupling circuits materially adds to the cost of producing the television receivers.

In order to provide the desired operation of the receiver circuit, some of the electron discharge tubes must be energized from a comparatively high voltage source of direct current, as for example, the video amplifier tube, and the horizontal oscillator and sweep tubes. Horizontal sweep output circuits as presently used, commonly employ a screen grid type electron discharge tube whose plate electrode is energized in a bootstrap flyback circuit from the comparatively high voltage source of direct current, while its screen electrode must be connected to a lower potential source of direct current.

It is proposed to connect the discharge tubes that are operated at comparatively low direct current potentials to the high voltage source in a network wherein certain of the tubes are effectively connected in series across the source, and the voltage is thereby distributed between two tubes. However, various ones of the low potential operated discharge tubes, such as the radio frequency and intermediate frequency amplifier tubes, operate in circuits having automatic gain control such that their plate load currents vary widely under different conditions of receiver operation. This disturbs the balance of the distributing network and changes the potential on various tubes adversely affecting the operation thereof. Syllabic audio level variations in the audio output tube current and picture content variations in video and clipper tubes may also produce undesirable voltage variations when using series connected tubes.

Several circuits require stabilized supply potentials for a steady picture. For instance, it would be desirable to connect the low voltage screen electrode of the output tube of the horizontal sweep system in this network but any variations in the voltage supplied to the screen grid electrode are very undesirable since the television picture size will be changed markedly by such variations.

It is an object of the present invention to provide a high voltage distribution system for efficiently providing anode operating potentials for the electron discharge tubes of a television receiver.

Another object of the present invention is to provide a network for supplying the direct current operating potentials required by the anodes of the electron discharge tubes of a television receiver, wherein certain of the tubes are connected in series across the total high voltage output, in which the intermediate potential is stabilized to reduce variations therein with changes in load current of the tubes, as well as syllabic and other low frequency current changes in various tubes.

A further object of the present invention is to provide a direct current distribution network for a television receiver providing a high direct current potential and an intermediate direct current potential, with the horizontal sweep system of the receiver being connected to the high voltage and having the screen grid of the output tube connected to the intermediate voltage which is stabilized so that changes in load current of the tubes of the system do not cause changes in the intermediate potential which would in turn cause change in the amplitude of the sweep.

A feature of this invention is the provision of a television receiver having rectifier means for providing relatively high positive potential as required for certain of the tubes of the receiver, and with the tubes requiring lower voltage being connected as two series connected groups through an intermediate conductor, one series connected group including tubes drawing variable load currents during operation of the receiver, and the other group including at least one tube which serves as a voltage regulator for stabilizing the voltage of the intermediate conductor.

Another feature of the invention is the provision of a high voltage distribution network for the tubes of a television receiver wherein certain of the tubes are connected between positive and negative conductors to the total voltage of the high voltage supply and others are connected in series thereto through an intermediate conductor, wherein an audio amplifier tube having plate and cathode resistors is connected across the total voltage, and an audio output tube is connected between the intermediate conductor and the high positive potential conductor with the control grid thereof connected directly to the plate of the audio amplifier tube so that the audio output tube stabilizes the potential of the intermediate conductor.

A further feature of this invention is the provision of a network for connecting tubes of a television receiver to a high voltage supply with certain tubes connected across the total voltage of the supply and others connected in series thereto through an intermediate conductor at a lower potential, and with the screen grid of the horizontal output tube connected to the intermediate conductor which is stabilized to hold the sweep and high voltage constant. This eliminates the screen dropping resistor which causes variations in horizontal size and high voltage with changes in screen currents.

Further objects, features and the attending advantages of the invention will be apparent from a consideration of the following description when taken in connection with the accompanying drawings wherein.

In practicing the invention there is provided a television receiver including a plurality of electron discharge tubes including audio amplifier and audio output tubes and a horizontal sweep output tube. Some of the tubes require a relatively high B+ voltage which is provided by a rectifier power supply. Other tubes of the receiver require less voltage and to provide the required voltage efficiently, these tubes are connected between the positive and negative terminals of the power supply and an intermediate conductor so that the various tubes are efficiently connected in series across the power supply. Certain of the low voltage tubes draw varying load current during the operation of the set, for example, the radio frequency and intermediate frequency amplifier tubes which are connected in an automatic gain control circuit. These tubes are all connected between the negative conductor and the intermediate conductor. Other tubes are connected between the intermediate conductor and the positive conductor and of these at least one is connected to operate as a voltage regulator to stabilize the voltage of the intermediate conductor. The voltage stabilizing action may be achieved by connecting the audio output tube between the intermediate conductor and the positive conductor, and connecting the audio amplifier feeding the audio output tube across the entire power supply. A self-bias resistor is connected between the cathode of the first audio amplifier and the negative conductor, and another resistor is connected from the plate to the positive conductor. The self-bias resistor provides D. C. degeneration which causes the plate to be held at a relatively constant potential, irrespective of normal tube and resistor tolerances. Since the plate is directly connected to the grid of the audio output stage, this holds the intermediate conductor at a substantially fixed potential. This action is made more effective by the use of an audio amplifier tube having a very high $G_m$. The intermediate conductor is held at a sufficiently constant potential that the horizontal sweep tube may be connected to the positive potential in a power feedback circuit with the screen grid connected to the intermediate conductor. The screen grid is held so nearly constant that the output of the sweep system, the high voltage, and the size of the picture are held substantially constant for signal strength variations. It may also be desirable to operate the vertical deflection system from the high voltage developed by the power feedback and this will also remain constant to hold the vertical size quite constant.

Figure 1:
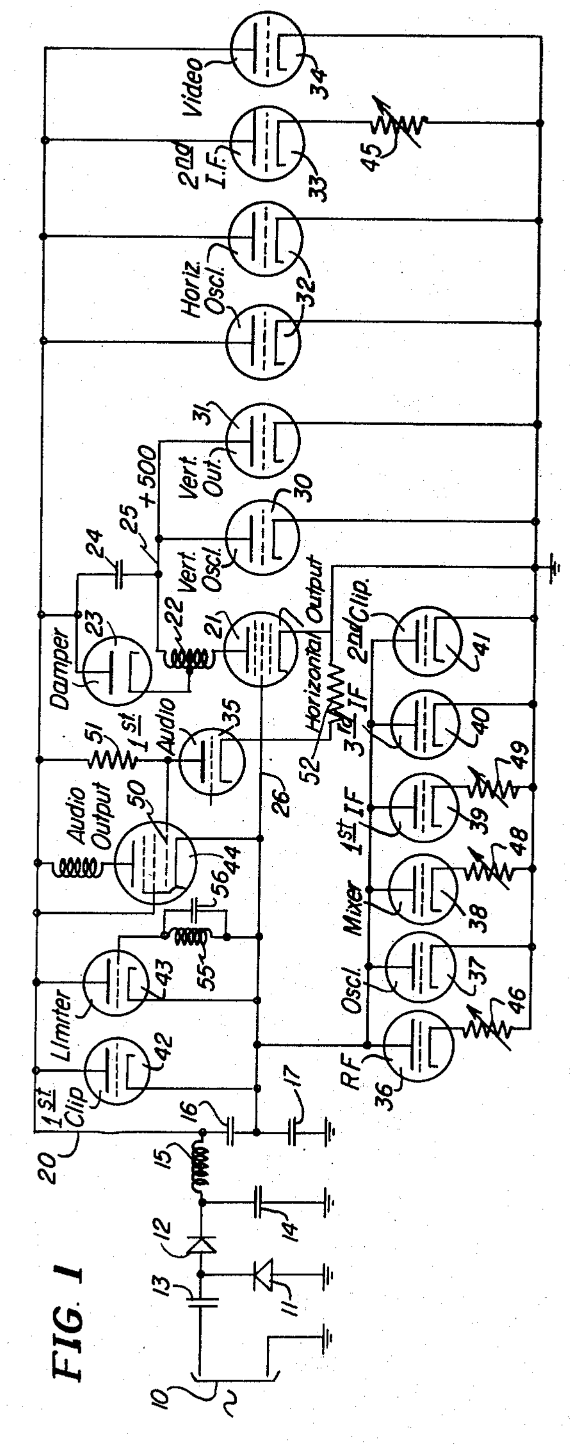
Fig. 1 is a schematic diagram illustrating the power distribution system in accordance with the invention.

Referring now to the drawings, in Fig. 1 there is illustrated in schematic form the tubes of a television receiver and the connection of the plate-cathode circuits thereof to a high potential direct current supply means. An alternating current source which may be the standard 110 volt A. C. supply is applied to the input terminals 10 of the system. The alternating current applied is converted to a high voltage direct current by the voltage doubler including rectifiers 11 and 12, and condensers 13 and 14. This potential may be smoothed by a filter formed by the inductance 15 and the condensers 16 and 17. The high voltage potential is therefore developed between the conductor 20 and ground. In such a system with a voltage of the order of 115 volts applied to the terminals 10, the voltage of conductor 20 will be about 250 volts. Although the negative terminal of the power supply is illustrated as a ground connection, it will be referred to as a negative conductor since either ground or a separate conductor may be used in various circuits as desired.

The circuit of Fig. 1 illustrates one manner in which the various tubes required in a television receiver may be connected to the high voltage supply to provide the required operating potential with a minimum of power. In this system the horizontal sweep output tube 21 has the cathode thereof connected to ground and the plate connected through inductor 22 and the parallel circuit formed by the diode rectifier 23 and condenser 24 to the positive conductor 20. This illustrates schematically a power feedback type sweep system wherein the flyback energy is rectified by the diode 23 to produce a voltage in conductor 25 substantially higher than the power supply voltage in conductor 20. This circuit may take various well-known forms and will not be described in detail. It is desired to point out, however, that the screen of the tube 21 must be connected to a lower potential and is connected in the present instance to conductor 26 as will be described more in detail. A vertical oscillator tube 30 and a vertical output tube 31 may be connected to the conductor 25 to thereby be energized by the increased voltage in the horizontal sweep output system which is generally referred to as the bootstrap voltage. A pair of horizontal oscillator tubes 32 may be connected across the power supply between conductor 20 and ground and the second intermediate frequency amplifier tube 33, video amplifier tube 34 and first audio amplifier tube 35 may also be connected across the entire voltage of the power supply between conductor 20 and ground.

Certain of the other tubes in the receiver require smaller voltages for the plate-cathode operating potential. These tubes will operate satisfactorily at a voltage of about 150 volts. Among the tubes which may be operated at this voltage are the radio frequency amplifier tube 36, the oscillator 37, mixer 38, first intermediate frequency amplifier 39, third intermediate frequency amplifier 40, and the second clipper 41. The cathodes of these tubes are connected to ground and the plates are connected to the intermediate conductor 26 referred to above. In order to supply current to the conductor 26 from the high voltage supply, other tubes requiring low voltage may be connected between the conductor 26 and the conductor 20. These tubes may be the first clipper tube 42, the audio limiter tube 43 and the audio output tube 44. It is to be pointed out that the particular arrangement of tubes illustrated in Fig. 1 may be changed in various ways and the invention is not to be limited to the specific connection illustrated. It is desirable for known reasons to connect the first clipper in the upper section of the power supply and the second clipper in the lower section so that the cathode thereof is grounded. Although the limiter tube may be connected in either the lower section or the upper section, it is found that connecting the first clipper, limiter, and audio output in the upper section provides substantially the amount of current required by the tubes connected in the lower section. The audio output tube draws a large amount of current, substantially more than the other tubes in the system, and therefore compensates for a larger number of tubes in the lower section.

In the circuit shown in Fig. 1 the audio output tube functions to stabilize the voltage of the intermediate conductor 26. The voltage of this conductor would tend to change due to the change in load current of certain of the tubes in the lower section of the power supply. This is illustrated schematically by the variable resistors 45, 46, 48 and 49 connected to the cathodes of the tubes 33, 36, 38 and 39. Actually the variation results from change in automatic gain control bias which is applied to the radio frequency amplifier, the mixer and the first and second intermediate frequency amplifier tubes. It is to be pointed out that gain control bias may be provided to other tubes than those illustrated, but in any case it is a necessary feature in a high quality television receiver to provide an automatic gain control bias to some of the tubes and it will cause variation in the load currents of the tubes to which it is applied.

It is essential for the proper operation of the receiver that the potential of the conductor 26 be stabilized and not vary with the variation in load currents. This is particularly true inasmuch as the conductor 26 is connected to the screen grid of the horizontal output tube 21. Variations in the screen potential of this tube will result in variations in the output current thereof which will cause change in the horizontal size of the picture. This will also cause a change in the bootstrap voltage of conductor 25 which in turn will cause a change in the vertical size inasmuch as the vertical oscillator and output stages are connected to this voltage. It is also desirable for best operation of the other tubes that the plate voltage remain constant.

The voltage of the conductor 26 is stabilized by action of the audio output tube 44. As previously stated, this tube draws large current and is therefore capable of providing a control of the potential of the conductor 26. As the audio output tube is seldom required to provide its maximum power output, its plate current may be varied over a substantial range and therefore stabilize the voltage of conductor 26 without affecting the audio level or the audio quality. The tubes connected in the upper and lower circuits are so chosen that under normal receiver operation the audio output tube operates about in the middle of its plate current range. This control is achieved by the application of a substantially constant voltage to the control grid 50 of the audio output tube 44. This voltage is obtained from the plate of the first audio amplifier tube 35 which is connected through resistor 51 to the conductor 20. The cathode of the audio amplifier is connected through resistor 52 to ground. The resistor 52 provides self-bias to the audio amplifier 35, causing degeneration therein so that the direct current plate voltage remains substantially constant. The audio output tube 44 has very high $G_m$ so that a very small change in grid voltage produces a large change in plate current.

Figure 2:
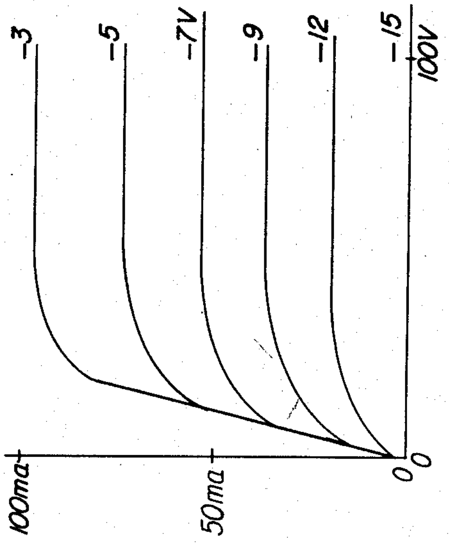
Fig. 2 is a family of curves illustrating the voltage regulation operation of the system.

The characteristics of such a tube are shown in Fig. 2 with the various curves showing the plate current provided by different grid voltages. The output tube 44 operates at a voltage of about 100 volts and normally draws a plate current of about 50 milliamperes. This would require the grid to be 7 volts negative with respect to the cathode or have a voltage of about 143 volts when the conductor 26 has a voltage of 150 volts. A variation of the load current of about 9 milliamperes at this point will cause a change in the potential of the conductor 26 of only 1 volt. This slight variation will hold the conductor 26 very stable and not adversely affect the other tubes in the receiver. It will be apparent that variation in the values of the plate resistor 51 and cathode resistor 52 will change the operating point of the output tube 44 and thereby change the voltage of the intermediate conductor 26. However, these values are not unduly critical and when using components readily available, the tolerances are such that the voltage of the intermediate conductor is held at a sufficiently constant value.

Figure 3:
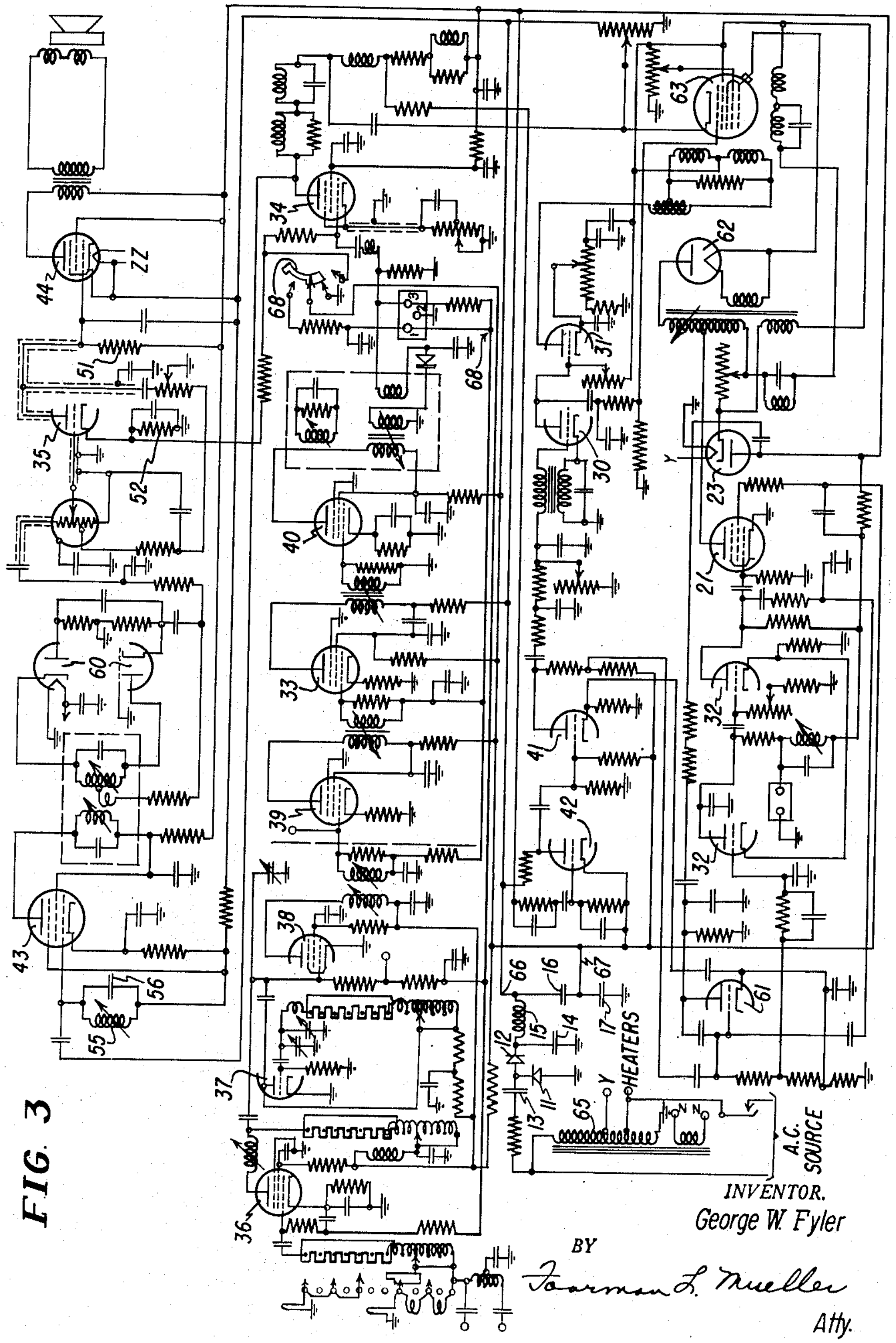
Fig. 3 is a complete circuit diagram of a television received in accordance with the invention.

Referring now to Fig. 3, this illustrates the complete circuit of a television receiver embodying the B+ distributing network in accordance with the invention. In this figure the tubes requiring plate potential are given the same numbers as in Fig. 1. In addition to these tubes, the double diode 60 serves as the audio detector, the triode section 61 provides phase control of the horizontal sweep system, the diode 62 provides very high voltage, and the cathode ray tube 63 is the picture tube of the receiver. None of these tubes are connected to the B+ supply and accordingly these tubes were not illustrated in Fig. 1. In Fig. 3 the alternating current energizing source is applied to an auto-transformer 65 which slightly steps up the voltage with respect to ground so that the output of the rectifier voltage doubler is increased to about 280 volts. The total voltages applied appears at the conductor 66 and the intermediate potential appears at conductor 67.

It will be noted that the audio output tube 44 is connected between the conductor 67 and the conductor 66, and the audio amplifier tube 35 is connected between the conductor 66 and ground. An automatic gain control bias is provided at the point 68 and may be applied to the radio frequency amplifier 36, the mixer 38, the first intermediate frequency amplifier 39, and the second intermediate frequency amplifier 33. The application of the gain control bias is controlled by the switch 68 which provides gain control for more of the stages for local or strong signal operation than for fringe or weak signal operation. This indicates that various arrangements can be provided as may be desired. The action of the audio output tube 44 stabilizes the potential of the conductor 67 so that this potential may be applied to the screen of the sweep output tube 21 without causing variations in output as the gain control bias changes. This results in the picture size and brightness remaining constant, both the horizontal size resulting from the output current of the tube 21, and vertical size resulting from the constant bootstrap voltage applied to the oscillator tube 30 and output tube 31 of the vertical deflection system.

The direct connection of the plate of the first audio amplifier to the grid of the audio output stage provides regulation action which is not affected by the low frequency syllabic voltage changes produced by the audio signal. Alternating current coupling from the first audio stage to the audio output would result in syllabic variations in plate current, and when the volume control is at a maximum, the grid current rectification of the audio output tube would cause even greater changes. To prevent changes in the potential of the intermediate conductor with volume control settings, the grid of the first audio amplifier must be free of direct current potentials. This is accomplished by applying the audio signal to the first audio frequency amplifier through a capacitive coupling, and by providing cathode bias which is more than adequate to handle the maximum audio levels without producing grid current.

The series condensers across the conductors of the power supply must be fairly large to filter the power current and to bypass the audio current of the output tube. It is also necessary that the video amplifier, horizontal output circuit and second clipper be bypassed with relatively low impedances to eliminate the effects of the low frequency variations in the currents through these tubes on the other circuits.

The components which are most important to the invention as used in the circuit of Fig. 3, will now be further described. As previously stated, the alternating current supply is provided through an auto-transformer which increases the voltage slightly with the voltage provided in conductor 66 being of the order of 280 volts and the voltage at conductor 67 being of the order of 155 volts. The condensers 16 and 17 are relatively large to assist in the stabilization of the voltages. Condensers having capacities of 200 microfarads have been found satisfactory. The audio amplifier tube 35 used is one section of a 6SN7GT with the plate resistor 51 having a value of 33,000 ohms and the cathode resistor 52 having a value of 1200 ohms. This normally provides a voltage at the plate of 148 volts which is applied directly to the grid of the tube 44. As shown in Fig. 3, the resistor 52 is bypassed by a condenser, and the value of this resistor is sufficiently large to provide substantial direct current degeneration in the tube 35. This tends to reduce the effect of variations in the values of resistors 51 and 52 and of variations in the characteristics of the tube 35 on the regulating voltage at the plate of this tube so that this voltage remains quite constant to provide accurate regulating action. This permits the use of components having standard tolerances and also takes care of variations resulting from aging of the components. As the cathode of the tube 44 is connected to the conductor 67, which has a voltage of about 155 volts, the voltage of 148 volts applied from the plate of tube 35 to the grid of tube 44 provides a negative bias on this grid of about 7 volts as previously described. The tube 44 used is of the 6W6GT type which has a very high $G_m$. It is to be pointed out that these values are merely representatives and are given for the purpose of illustration. It will be obvious that tubes of other types and components of other values may be used in accordance with the teachings of the invention.

It is therefore seen from the above that a very simple and efficient arrangement is provided for providing operating plate potentials for the tubes in a television receiver from a rectified power supply. The arrangement is such that the use of voltage dropping resistors is held to a minimum and therefore the power wasted is similarly reduced to a minimum. High voltage is applied to tubes requiring the same so that no loss in efficiency takes place. The tubes not requiring high voltage are connected in a series parallel arrangement so that the power is efficiently utilized and the current drain on the power supply is held at a minimum. The arrangement wherein certain low voltage tubes which draw a variable load current are placed in the lower section of the power supply, and the audio output tube which draws relatively large current is placed in the upper section, permits the output tube to be used to stabilize the intermediate connector between the sections so that the potential on this conductor remains sufficiently constant despite varying load currents and can be used as the screen potential for the horizontal sweep tube. This results in a more efficient arrangement than may be obtained by the use of dropping resistors and at the same time holds the screen potential constant so that the horizontal sweep and high voltage output is relatively constant and picture size does not change. Since the output tube screen is held at constant voltage, the vertical deflection system may be connected to the bootstrap voltage without causing changes in vertical size.

Although certain embodiments of the invention have been described which are illustrative thereof, it is obvious that various changes and modifications can be made therein without departing from the intended scope of the invention as defined in the appended claims.

I claim:

1. A television receiver including a first group of electron discharge tubes requiring relatively high operating potential and a second group of electron discharge tubes requiring lower operating potentials, with the load current of at least one of the tubes in said second group varying with operating conditions, said receiver including sweep circuit means requiring a high operating potential and a lower operating potential which must be substantially constant to prevent fluctuations in picture size, means providing a direct current of high potential including positive and negative conductors, means connecting said tubes of said first group between said positive and said negative conductors, an intermediate conductor, means connecting a first plurality of tubes of said second group including said one device having variable load current between said negative conductor and said intermediate conductor, means connecting a second plurality of tubes of said second group between said intermediate conductor and said positive conductor so that said first and second plurality of tubes are effectively connected in series across direct current means, condenser means including a first portion connected between said negative conductor and said intermediate conductor and a second portion connected between said intermediate conductor and said positive conductor, means connecting said horizontal sweep circuit means to said positive conductor and said negative conductor for applying high operating potential thereto and to said intermediate conductor for providing said lower operating potential, at least one of said tubes of said second plurality drawing relatively large current and serving as a voltage regulator to stabilize the potential of said intermediate conductor in the presence of variations of load current in said one tube of said first plurality, and means applying a substantially constant reference voltage to said tube serving as a voltage regulator to render the voltage regulation produced thereby highly accurate.

2. A television receiver including a first group of electron discharge tubes requiring relatively high operating potential and a second group of electron discharge tubes requiring lower operating potentials, with the load currents of at least one of the tubes in said second group varying with operating conditions, means providing direct current of high potential including positive and negative conductors, means connecting said tubes of said first group between said positive and said negative conductors, one of said tubes of said first group serving as an audio amplifier stage in said receiver and having at least an anode, a cathode and a control grid, first resistor means connecting said cathode to said negative conductor, condenser means bypassing said first resistor means, second resistor means connecting said anode to said positive conductor, an intermediate conductor, means connecting a plurality of said tubes of said second group including said one tube having variable load current between said negative conductor and said intermediate conductor, means connecting at least one of said tubes of said second group which serves as an audio output stage and drawing relatively large output current between said intermediate conductor and said positive conductor, said tube serving as an audio output stage having at least a cathode, an anode, a control grid and a screen grid with said cathode being connected to said intermediate conductor, said control grid being connected directly to said anode of said tube serving as an audio amplifier, and said screen grid connected to said positive conductor, and impedance means connecting said anode of said tube serving as an audio output stage to said positive potential, so that said audio output stage stabilizes the potential of said intermediate conductor.

3. A television receiver including a first group of electron discharge tubes requiring relatively high operating potential and a second group of electron discharge tubes requiring lower operating potentials, with the load currents of at least one of the tubes in said second group varying with operating conditions, means providing direct current of high potential including positive and negative conductors, means connecting said tubes of said first group between said positive and said negative conductors, one of said tubes of said first group serving as an audio amplifier stage in said receiver and having at least an anode, a cathode and a control grid, first resistor means connecting said cathode to said negative conductor, condenser means bypassing said first resistor means, said first resistor means and said condenser means providing degenerative action in said audio amplifier stage tube, second resistor means connecting said anode to said positive conductor, an intermediate conductor, means connecting a first plurality of tubes of said second group including said one tube having variable load current between said negative conductor and said intermediate conductor, means connecting a plurality of said tubes of said second group between said intermediate conductor and said positive conductor, one of said tubes connected between said intermediate conductor and said positive conductor serving as an audio output stage and drawing relatively large current, said audio output tube having at least a cathode, an anode, a control grid and a screen grid with said cathode connected to said intermediate conductor, said control grid connected directed to said anode of audio amplifier tube, and said screen grid connected to said positive conductor, impedance means connecting said anode of said audio output tube to said positive potential, so that said audio output tube acts as a voltage regulator for stabilizing the potential of said intermediate conductor.

4. A television receiver including a first group of electron discharge tubes requiring relatively high operating potential and a second group of electron discharge tubes requiring lower operating potentials, with the load currents of at least one of the tubes in said second group varying with operating conditions, means providing direct current of high potential including positive and negative conductors, means connecting said tubes of said first group between said positive and said negative conductors, one of said tubes of said first group serving as an audio amplifier stage in said receiver and having at least an anode, a cathode and a control grid, first resistor means connecting said cathode to said negative conductor, condenser means bypassing said first resistor means, second resistor means connecting said anode to said positive conductor, a second tube of said first group serving as the output stage of the horizontal sweep system of said receiver and including a screen grid, an intermediate conductor connected to said screen grid of said second tube, means connecting a plurality of tubes of said second group including at least one tube having variable load current between said negative conductor and said intermediate conductor, means connecting at least one of said tubes of said second group which serves as an audio output stage and draws relatively large current between said intermediate conductor and said positive conductor, said audio output tube having at least a cathode, an anode, a control grid and a screen grid with said cathode connected to said intermediate conductor, said control grid connected directly to said anode of said audio amplifier tube, and said screen grid connected to said positive conductor, impedance means connecting said anode of said audio output tube to said positive potential, said audio output tube acting as a voltage regulator for stabilizing the potential of said intermediate conductor and holding the potential of said screen grid of said second tube substantially constant in the presence of variations in load current of at least one tube connected between said negative conductor and said intermediate conductor.

5. A television receiver including a first group of electron discharge tubes requiring a relatively high operating potential and a second group of electron discharge tubes requiring lower operating potentials, with the load currents of at least one of the tubes in said second group varying with operating conditions, means providing direct current of high potential including positive and negative conductors, means connecting said tubes of said first group between said positive and said negative conductors, one of said tubes of said first group serving as an audio amplifier stage in said receiver and having at least an anode, a cathode and a control grid, first resistor means connecting said cathode to said negative conductor, condenser means bypassing said first resistor means, said first resistor means having a value such that substantial degeneration is produced in said audio amplifier stage tube, second resistor means connecting said anode to said positive conductor, a second tube of said first group serving as the output stage of the horizontal sweep system of said receiver and including a screen grid, an intermediate conductor connected to said screen grid of said second tube, means connecting a first plurality of tubes of said second group including at least one tube having variable load current between said negative conductor and said intermediate conductor, means connecting a second plurality of said tubes of said second group including one tube which serves as an audio output stage and draws relatively large current between said intermediate conductor and said positive conductor, said audio output tube having at least a cathode, an anode, and a control grid with said cathode connected to said intermediate conductor, and said control grid connected directly to said anode of said audio amplifier tube, impedance means connecting said anode of said audio output tube to said positive potential, said audio output tube acting as a voltage regulator for stabilizing the potential of said intermediate conductor and holding the potential of said screen grid of said second tube substantially constant in the presence of variations in load current of said tubes connected between said negative conductor and said intermediate conductor.

6. A television receiver including a first group of electron discharge tubes requiring relatively high operating potential and a second group of electron discharge tubes requiring lower operating potentials, with the load currents of at least one of the tubes in said second group varying with operating conditions, means providing direct current of high potential including positive and negative conductors, means connecting said tubes of said first group between said positive and said negative conductors, one of said tubes of said first group serving as an audio amplifier stage in said receiver and having at least an anode, a cathode and a control grid, first resistor means connecting said cathode to said negative conductor, condenser means bypassing said first resistor means, second resistor means connecting said anode to said positive conductor, said receiver including an additional electron discharge tube serving as the output stage of the horizontal sweep system of said receiver and including an anode adapted to be connected to a very high potential and a screen grid adapted to be connected to a lower potential, a power feedback circuit connecting said anode of said additional tube to said positive conductor and providing a potential therefor greater than that of said positive conductor, an intermediate conductor connected to said screen grid of said additional tube, means connecting a first plurality of tubes of said second group including at least one tube having variable load current between said negative conductor and said intermediate conductor, means connecting at least one of said tubes of said second group which serves as an audio output stage and draws relatively large current between said intermediate conductor and said positive conductor, said audio output tube having at least a cathode, an anode, a control grid and a screen grid with said cathode connected to said intermediate conductor, said control grid being connected directly to said anode of said audio amplifier tube, and said screen grid connected to said positive conductor, and impedance means connecting said anode of said audio output tube to said positive potential, said audio output stage acting as a voltage regulator for stabilizing the potential of said intermediate conductor and holding the potential of said screen grid of said additional tube substantially constant in the presence of variations in load current of any of said tubes connected between said negative conductor and said intermediate conductor.

7. A television receiver including a first group of electron discharge tubes requiring relatively high operating potential and a second group of electron discharge tubes requiring lower operating potentials, with at least one of the tubes in said second group drawing varying current, means providing direct current of high potential including positive and negative conductors, means connecting said tubes of said first group between said positive and said negative conductors, said receiver including a multigrid electron discharge tube serving as the output stage of the horizontal sweep system of said receiver and including an anode adapted to be connected to a very high potential and a screen grid adapted to be connected to a lower potential, a power feedback circuit connecting said anode of said additional tube to said positive conductor and providing a potential therefor greater than that of said positive conductor, said receiver including other tubes connected to said power feedback circuit and operating from said greater potential, an intermediate conductor connected to said screen grid of said additional tube, means connecting a first plurality of tubes of said second group including said one tube drawing varying current between said negative conductor and said intermediate conductor, means connecting at least one of said tubes of said second group which serves as an audio output tube and draws relatively large current between said intermediate conductor and said positive conductor, said audio output tube acting as a voltage regulator for stabilizing the potential of said intermediate conductor, and means applying a substantially constant reference voltage to said audio output tube to render the voltage regulation action thereof on said intermediate conductor highly accurate, so that the potential of said screen grid of said multigrid tube remains substantially constant in the presence of variations in current of said one tube connected between said negative conductor and said intermediate conductor, whereby the output of said multigrid tube remains substantially constant and said greater potential also remains substantially constant.

References Cited in the file of this patent

UNITED STATES PATENTS

| Number | Name | Date |
|---|---|---|
| 1,986,597 | Nyman | Jan. 1, 1935 |
| 2,310,342 | Artzt | Feb. 9, 1943 |
| 2,364,761 | Schade | Dec. 12, 1944 |
| 2,458,365 | Fyler | Jan. 4, 1949 |

FOREIGN PATENTS

| Number | Country | Date |
|---|---|---|
| 349,483 | Great Britain | May 26, 1931 |